(12) United States Patent
Su et al.

(10) Patent No.: US 10,554,283 B2
(45) Date of Patent: Feb. 4, 2020

(54) METHOD AND DEVICE FOR UPLINK INFORMATION FEEDBACK AND DOWNLINK DATA TRANSMISSION

(71) Applicant: CHINA ACADEMY OF TELECOMMUNICATIONS TECHNOLOGY, Beijing (CN)

(72) Inventors: Xin Su, Beijing (CN); Yang Song, Beijing (CN); Chuanjun Li, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/067,122

(22) PCT Filed: Nov. 1, 2016

(86) PCT No.: PCT/CN2016/104267
§ 371 (c)(1),
(2) Date: Jun. 28, 2018

(87) PCT Pub. No.: WO2017/113982
PCT Pub. Date: Jul. 6, 2017

(65) Prior Publication Data
US 2019/0007119 A1    Jan. 3, 2019

(30) Foreign Application Priority Data
Dec. 28, 2015  (CN) .......................... 2015 1 1001496

(51) Int. Cl.
*H04B 7/06*    (2006.01)
*H04B 7/0456*  (2017.01)
(Continued)

(52) U.S. Cl.
CPC ............. *H04B 7/0639* (2013.01); *H04B 7/04* (2013.01); *H04B 7/0417* (2013.01); *H04B 7/0456* (2013.01)

(58) Field of Classification Search
CPC ...... H04B 7/0639; H04B 7/04; H04B 7/0417; H04B 7/0456
See application file for complete search history.

(56) References Cited

U.S. PATENT DOCUMENTS

2008/0037669 A1* 2/2008 Pan ...................... H04B 7/0417
                                                      375/260
2009/0225737 A1* 9/2009 Kim ......................... H04L 1/06
                                                      370/342
(Continued)

FOREIGN PATENT DOCUMENTS

CN    102104994 A    6/2011
CN    102163997 A    8/2011
(Continued)

OTHER PUBLICATIONS

State IP Office of PR China—International Search Report of the International Searching Authority dated Feb. 6, 2017 (with English translation) for International Application No. PCT/CN2016/104267 (5 pgs).

(Continued)

*Primary Examiner* — Sophia Vlahos
(74) *Attorney, Agent, or Firm* — Womble Bond Dickinson (US) LLP (57) ABSTRACT

Provided are a method and device for uplink information feedback and downlink data transmission, used, when the speed of motion of a terminal is high, for solving the problem of CSI information reported by the terminal being insufficient to track changes on the channel, such that data transmission carried out on the basis of the channel state information reported by the terminal causes seriously (Continued)

S11

A base station obtains the *l*-th level of pre-coding matrixes group associated with a pre-coding matrix of a UE, where the pre-coding matrix of the UE corresponds to *L* number of pre-coding matrixes groups, each pre-coding matrixes group includes at least one pre-coding matrix in a preset codebook, *l*=1, ..., *L*, and *L* is a positive integer

S12

The base station transmits downlink data to the UE according to pre-coding matrixes in the obtained *l*-th level of pre-coding matrixes group degraded performance. The method comprises: a base station obtaining a precoding matrix of a terminal, and an l-th precoding matrix set of L precoding matrix sets corresponding to said precoding matrix; each precoding matrix set of said L precoding matrix sets containing at least one precoding matrix; said at least one precoding matrix originating from a preset codebook, wherein $1 \leq L$ and L is a positive integer; according to the precoding matrix contained in the obtained l-th precoding matrix set, the base station sending downlink data to the terminal. By means of the precoding matrix set, a relatively wide beam is formed to cover the user, thus guaranteeing downlink transmission for the terminal when it is moving at high speed, improving the reliability of downlink transmission.

16 Claims, 3 Drawing Sheets

(51) Int. Cl.
*H04B 7/04* (2017.01)
*H04B 7/0417* (2017.01)

(56) References Cited

U.S. PATENT DOCUMENTS

| | | | |
|---|---|---|---|
| 2010/0027456 A1 | 2/2010 | Onggosanusi et al. | |
| 2010/0027713 A1 | 2/2010 | Huang et al. | |
| 2011/0200139 A1* | 8/2011 | Jen | H04B 7/0639 375/296 |
| 2013/0107920 A1* | 5/2013 | Kim | H04L 1/0031 375/219 |
| 2014/0003395 A1* | 1/2014 | Hsu | H04B 7/0478 370/335 |
| 2017/0005712 A1* | 1/2017 | Jiang | H04B 7/0413 |
| 2017/0181153 A1* | 6/2017 | Choi | H04B 7/0417 |

FOREIGN PATENT DOCUMENTS

| | | |
|---|---|---|
| CN | 102792605 A | 11/2012 |
| CN | 103532661 | 1/2014 |

OTHER PUBLICATIONS

State IP Office of PR China—Written Opinion of the International Searching Authority dated Feb. 6, 2017 (with English translation) for International Application No. PCT/CN2016/104267 (9 pgs).

* cited by examiner

METHOD AND DEVICE FOR UPLINK INFORMATION FEEDBACK AND DOWNLINK DATA TRANSMISSION

CROSS-REFERENCE TO RELATED APPLICATIONS

This patent application is a U.S. National Stage of International Application No. PCT/CN2016/104267, filed Nov. 1, 2016, which claims the benefit of Chinese Patent Application No. 201511001496.5, filed Dec. 28, 2015, and entitled "Method and device for feeding back uplink information, and method and device for transmitting downlink data", which was hereby incorporated by reference in its entirety.

FIELD

The present application relates to the field of communications, and particularly to a method and device for feeding back uplink information, and a method and device for transmitting downlink data.

BACKGROUND

Since the Multiple-Input Multiple-Output (MIMO) technologies are important to an improvement of a peak rate, and a utilization ratio of system spectrums, all the radio access technology standards of Long Term Evolution (LTE), LTE-Advanced (LTE-A), etc., are built based upon the MIMO plus Orthogonal Frequency Division Multiplexing (OFDM) technologies. A performance gain of the MIMO technologies arises from a space freedom available in a multi-antenna system, so one of the most important evolvements of the MIMO technologies being standardized is an extension of dimensions. In the LTE Rel-8, MIMO transmission of at most four layers can be supported. In the Rel-9, primarily the Multi-User MIMO (MU-MIMO) technologies have been enhanced, and at most four downlink transmission data layers can be supported in MU-MIMO transmission of the Transmission Mode (TM)-8. In the Rel-10, an 8-port Channel State Information-Reference Signal (CSI-RS), a User Equipment (UE)-specific Reference Signal (URS), and a multi-granularity codebook have been introduced to improve a space resolution of channel state information, and to further extend a transmission capacity of Single-User MIMO (SU-MIMO) to at most eight transmission data layers.

In a base station antenna system structured as a traditional Passive Antenna System (PAS), a plurality of antenna ports (each port corresponds to a separate radio frequency-intermediate frequency-baseband channel) are arranged horizontally, and a plurality of array elements in the vertical dimension corresponding to each port are connected through a radio frequency cable, so with the existing MIMO technologies, only space characteristics of signals of respective UEs in the horizontal dimension can be optimized by adjusting relative amplitudes/phases between the different ports in the horizontal dimension, and only uniform sector level beam-forming can be performed in the vertical dimension. After the Active Antenna System (AAS) technologies have been introduced to a mobile communication system, the base station antenna system can be provided with a higher freedom in the vertical dimension, and can optimize a signal at a UE level in the three-dimension space.

Further to the research, the standardization, and the development of the antenna technologies, the MIMO technologies are being further advanced in the industry toward becoming three-dimensional and large-scale. At present, there is a research project ongoing in the 3GPP on 3D channel modeling, and there are also researches and standardization efforts to be conducted as expected on the technologies of Elevation Beam Forming (EBF) of eight or less antenna ports, and Full Dimension-MIMO (FD-MIMO) of more than eight ports (e.g., 16, 32, or 64). Researches and test efforts have been conducted from the foresighted perspective in the academic community on the massive MIMO technologies based upon a larger-scale antenna array (including one or more hundreds and even more array elements). The academic researches, and the results of the preliminary channel in-situ measurements have showed that the massive MIMO technologies can greatly improve the utilization ratio of system bands, and support a larger number of accessing UEs, so the massive MIMO technologies are expected by the major research organizations to be one of the most promising physical layer technologies in a next-generation mobile communication system.

In the massive MIMO system, as there are an increasing number of antennas, the quality of transmitting data over a service channel, and the capability to suppress interference to the data have significantly benefited from the high space resolution of pre-coding/beam-forming arising from the extended array scale. However as a UE is moving at a very high speed, Channel State Information (CSI) reported by the UE may not be sufficient to follow up a varying condition of a channel, so it may be difficult at the base station side to match with the channel of the UE precisely in a timely manner, thus resulting in a serious loss of performance while data are being transmitted.

In summary, as a UE is moving at a very high speed, CSI reported by the UE may not be sufficient to follow up a varying condition of a channel, and if data are transmitted based upon the CSI reported by the UE, then there may be a serious loss of performance.

SUMMARY

Embodiments of the application provide a method and device for feeding back uplink information, and a method and device for transmitting downlink data so as to address the problem that as a UE is moving at a very high speed, CSI reported by the UE may not be sufficient to follow up a varying condition of a channel, and if data are transmitted based upon the CSI reported by the UE, then there may be a serious loss of performance.

An embodiment of the application provides a method for transmitting downlink data, the method including:

obtaining, by a base station, a pre-coding matrix of a UE, and an l-th level of pre-coding matrixes group among L number of pre-coding matrixes groups associated with the pre-coding matrix of the UE, where each of the L number of pre-coding matrixes groups includes at least one pre-coding matrix from a preset codebook, $1 \le l \le L$, and l and L are positive integers; and transmitting, by the base station, downlink data to the UE according to pre-coding matrixes in the l-th level of pre-coding matrixes group;

where any one of pre-coding matrixes in the preset codebook corresponds to the L number of pre-coding matrixes groups, the l-th level of pre-coding matrixes group comprises $N_l$ number of pre-coding matrixes, the $N_l$ number of pre-coding matrixes are first $N_l$ number of pre-coding matrixes in the preset codebook comprising the pre-coding matrixes sorted in an ascending order of their distances from the any one of pre-coding matrixes, or the $N_l$ number of pre-coding matrixes are first $N_l$ number of pre-coding matrixes in the preset codebook comprising the pre-coding matrixes sorted in an ascending order of their distances from a vector associated with a normal of an antenna array of the base station, $1 \leq N_l$, and $N_l$ is a positive integer.

Another embodiment of the application provides a method for feeding back uplink information, the method including:

selecting, by a UE, a pre-coding matrix from a preset codebook according to a measurement result of a downlink channel, and selecting an l-th level of pre-coding matrixes group from L number of pre-coding matrixes groups associated with the selected pre-coding matrix, where each of the L number of pre-coding matrixes groups includes at least one pre-coding matrix from the preset codebook, $1 \leq l \leq L$, and l and L are positive integers; and reporting, by the UE, a level index l of the selected pre-coding matrixes group to a base station;

where any one of pre-coding matrixes in the preset codebook corresponds to the L number of pre-coding matrixes groups, the l-th level of pre-coding matrixes group comprises $N_l$ number of pre-coding matrixes, the $N_1$ number of pre-coding matrixes are first $N_l$ number of pre-coding matrixes in the preset codebook comprising the pre-coding matrixes sorted in an ascending order of their distances from the any one of pre-coding matrixes, or the $N_l$ number of pre-coding matrixes are first $N_l$ number of pre-coding matrixes in the preset codebook comprising the pre-coding matrixes sorted in an ascending order of their distances from a vector associated with a normal of an antenna array of the base station, $1 \leq N_1$, and $N_l$ is a positive integer.

An embodiment of the application provides a base station including:

an obtaining module configured to obtain a pre-coding matrix of a UE, and an l-th level of pre-coding matrixes group among L number of pre-coding matrixes groups associated with the pre-coding matrix of the UE, where each of the L number of pre-coding matrixes groups includes at least one pre-coding matrix from a preset codebook, $1 \leq l \leq L$, and l and L are positive integers; and a transmitting module configured to transmit downlink data to the UE according to pre-coding matrixes in the l-th level of pre-coding matrixes group.

An embodiment of the application provides a UE including:

a selecting module configured to select a pre-coding matrix from a preset codebook according to a measurement result of a downlink channel, and to select an l-th level of pre-coding matrixes group from L number of pre-coding matrixes groups associated with the pre-coding matrix, where each of the L number of pre-coding matrixes groups includes at least one pre-coding matrix from the preset codebook, $1 \leq l \leq L$, and l and L are positive integers; and a reporting module configured to report a level index l of the selected pre-coding matrixes group to a base station.

Another embodiment of the application provides a base station including a processor, a memory, a transceiver, and a bus interface, where:

the processor is configured to read programs in the memory to execute:

obtaining a pre-coding matrix of a UE, and an l-th level of pre-coding matrixes group among L number of pre-coding matrixes groups associated with the pre-coding matrix, where each of the L number of pre-coding matrixes groups includes at least one pre-coding matrix from a preset codebook, $1 \leq l \leq L$, and l and L are positive integers; and transmitting downlink data to the UE according to pre-coding matrixes in the l-th level of pre-coding matrixes group;

where any one of pre-coding matrixes in the preset codebook corresponds to the L number of pre-coding matrixes groups, the l-th level of pre-coding matrixes group comprises $N_l$ number of pre-coding matrixes, the $N_l$ number of pre-coding matrixes are first $N_l$ number of pre-coding matrixes in the preset codebook comprising the pre-coding matrixes sorted in an ascending order of their distances from the any one of pre-coding matrixes, or the $N_l$ number of pre-coding matrixes are first $N_l$ number of pre-coding matrixes in the preset codebook comprising the pre-coding matrixes sorted in an ascending order of their distances from a vector associated with a normal of an antenna array of the base station, $1 \leq N_l$, and $N_l$ is a positive integer.

Another embodiment of the application provides a UE including a processor, a memory, a transceiver, and a bus interface, wherein:

the processor is configured to read programs in the memory to execute:

selecting a pre-coding matrix from a preset codebook according to a measurement result of a downlink channel, and selecting an l-th level of pre-coding matrixes group from L number of pre-coding matrixes groups associated with the pre-coding matrix, where each of the L number of pre-coding matrixes groups includes at least one pre-coding matrix from the preset codebook, $1 \leq l \leq L$, and l and L are positive integers; and reporting the level index l of the selected pre-coding matrixes group to a base station;

where any one of pre-coding matrixes in the preset codebook corresponds to the L number of pre-coding matrixes groups, the l-th level of pre-coding matrixes group comprises $N_l$ number of pre-coding matrixes, the $N_l$ number of pre-coding matrixes are first $N_l$ number of pre-coding matrixes in the preset codebook comprising the pre-coding matrixes sorted in an ascending order of their distances from the any one of pre-coding matrixes, or the $N_l$ number of pre-coding matrixes are first $N_l$ number of pre-coding matrixes in the preset codebook comprising the pre-coding matrixes sorted in an ascending order of their distances from a vector associated with a normal of an antenna array of the base station, $1 \leq N_1$, and $N_l$ is a positive integer.

In the solutions according to the embodiments of the application, the pre-coding matrixes in the codebook are grouped in advance into L number of pre-coding matrixes groups, a user is covered with a wider beam formed using the L number of pre-coding matrixes groups, and downlink data are encoded according to the pre-coding matrixes in each pre-coding matrixes group, so that downlink transmission of the UE moving at a high speed can be guaranteed to thereby improve the reliability of downlink transmission.

DETAILED DESCRIPTION OF THE EMBODIMENTS

In order to make the objects, technical solutions, and advantages of the embodiments of the application more apparent, the technical solutions according to the embodiments of the application will be described below in further details with reference to the drawings in the embodiments of the application, and apparently the embodiments to be described are only a part but not all of the embodiments of the application. Based upon the embodiments here of the application, all the other embodiments which can occur to those ordinarily skilled in the art without any inventive effort shall fall into the scope of the application.

The technical solutions according to the application can be applicable to various communication systems, e.g., the existing 2G and 3G communication systems, and the next generation of communication systems, e.g., a Global System of Mobile communication (GSM) system, a Code Division Multiple Access (CDMA) system, a Time Division Multiple Access (TDMA) system, a Wideband Code Division Multiple Access (WCDMA) system, a Frequency Division Multiplex Access (FDMA) system, an Orthogonal Frequency Division Multiplex Access (OFDMA) system, a Single Carrier-FDMA (SC-FDMA) system, a General Packet Radio Service (GPRS) system, a Long Term Evolution (LTE) system, or other similar communication systems.

A User Equipment (UE) in the embodiments of the application may be a wireless terminal, and the wireless terminal may refer to a device providing a user with voice and/or data connectivity, a handheld device with a wireless connection function, or another processing device connected with a wireless modem. The wireless terminal may communicate with one or more core networks over a Radio Access Network (RAN), and the wireless terminal may be a mobile terminal, e.g., a mobile phone (or referred to as a "cellular" phone), and a computer with a mobile terminal, e.g., a portable, pocket, handheld, built-in-computer, or on-vehicle mobile device, which exchange a text and/or data with the radio access network.

A base station in the embodiments of the application may refer to such a device in an access network that communicates with a wireless terminal over one or more sectors via an air interface. The base station may convert reciprocally between received air frame and IP packet, and operate as a router between the wireless terminal, and the remaining components of the access network, where the remaining components of the access network may include an Internet Protocol (IP) network. The base station may further coordinate attribute management on the air interface. For example, the base station may be a Base Communication module Station (BTS) in a GSM or CDMA system, or may be a base station (Node B) in a WCDMA system, or may be an evolved base station (Node B or eNB or e-Node B) in an LTE system, although the application will not be limited thereto.

The embodiments of the application will be described below in details with reference to the drawings. It shall be appreciated that the embodiments described here are only intended to illustrate and describe the application, but not intended to limit the application thereto.

Figure 1:
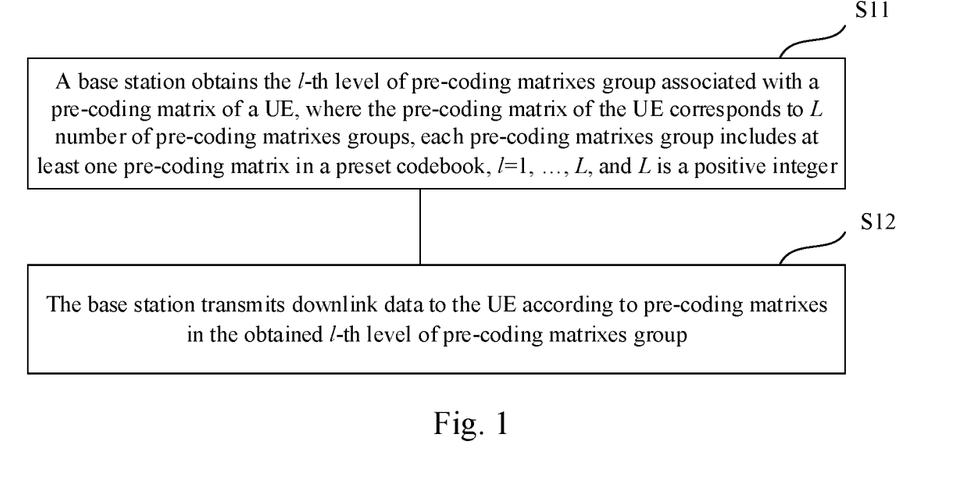
FIG. 1 is a schematic flow chart of a method for transmitting downlink data according to the first embodiment of the application.

According to the first embodiment of the application, a method for transmitting downlink data is provided, and as illustrated in FIG. 1, the method includes the following operations.

S11: A base station obtains the l-th level of pre-coding matrixes group associated with a pre-coding matrix of a UE, where the pre-coding matrix of the UE corresponds to L number of pre-coding matrixes groups, each pre-coding matrixes group includes at least one pre-coding matrix in a preset codebook, l=1, . . . , L, and L is a positive integer.

S12: The base station transmits downlink data to the UE according to pre-coding matrixes in the obtained l-th level of pre-coding matrixes group.

Specifically the base station obtains the pre-coding matrix of the UE, obtains the pre-coding matrixes group associated with the pre-coding matrix of the UE, pre-codes the downlink data to be transmitted to the UE, according to the pre-coding matrixes in the obtained pre-coding matrixes group, and then transmits the pre-coded downlink data to the UE. By way of an example, the base station multiples each pre-coding matrix in the obtained l-th level of pre-coding matrixes group by a weight of the pre-coding matrix, and pre-codes and transmits the downlink data to be transmitted to the UE, using the sum of the respective weighted pre-coding matrixes in the l-th level of pre-coding matrixes group. Of course, the embodiment of the application will not be limited to the processing scheme above, but other processing schemes may alternatively be applicable to the embodiment of the application, and they will not be enumerated here.

In the embodiment of the application, the base station obtains the pre-coding matrixes group associated with the pre-coding matrix of the UE, and pre-codes the downlink data to be transmitted to the UE, according to the pre-coding matrixes in the obtained pre-coding matrixes group. In the solution according to the embodiment of the application, the pre-coding matrixes in the codebook are grouped in advance so that any one of the pre-coding matrixes corresponds to L number of pre-coding matrixes groups, and a user is covered with a wider beam formed using the L number of pre-coding matrixes groups. Based upon the pre-coding matrix associated with a downlink channel of the UE, the base station selects a level of pre-coding matrixes group from the L number of pre-coding matrixes groups associated with the pre-coding matrix according to a moving speed of the UE, and pre-codes the downlink data according to the pre-coding matrixes in the level of pre-coding matrixes group, so that downlink transmission of the UE moving at the high speed may be guaranteed to thereby improve the reliability of downlink transmission.

There are the following two application scenarios of the embodiment of the application in an implementation.

The first scenario relates to a scenario where it is difficult to guarantee the reciprocity of uplink and downlink channels, e.g., in a Frequency Division Duplex (FDD) system, or a poorly calibrated Time Division Duplex (TDD) system.

In this scenario, the l-th level of pre-coding matrixes group for any one of the pre-coding matrixes in the codebook includes the first $N_l$ pre-coding matrixes in the codebook including the pre-coding matrixes sorted in an ascending order of their distances from the any one pre-coding matrix, where $1 \leq N_1$, and $N_1$ is a positive integer.

Specifically each pre-coding matrix in the codebook corresponds to L number of pre-coding matrixes groups, and each pre-coding matrixes group forms a wider coverage area of beams. In order to group the codebook into L number of pre-coding matrixes groups corresponding to each precoding matrix, firstly the distances between a first pre-coding matrix, and other pre-coding matrixes than the first pre-coding matrix in the codebook are determined, and the other pre-coding matrixes in the codebook are sorted in an ascending order of their distances; then the first $N_1$ number of pre-coding matrixes are selected from the remaining pre-coding matrixes (i.e., the other pre-coding matrixes than the first pre-coding matrix in the codebook) as the first level of pre-coding matrixes group, the first $N_2$ number of pre-coding matrixes are selected from the remaining pre-coding matrixes (i.e., the other pre-coding matrixes than the first pre-coding matrix in the codebook) as the second level of pre-coding matrixes group; and so on until the first $N_L$ number of pre-coding matrixes are selected from the remaining pre-coding matrixes (i.e., the other pre-coding matrixes than the first pre-coding matrix in the codebook) as the L-th level of pre-coding matrixes group, so that the L number of pre-coding matrixes groups associated with the first pre-coding matrix are determined, where $N_1<N_2< \ldots <N_L$, $1 \leq l \leq L$, and the (l+1)-th level of pre-coding matrixes group includes all the pre-coding matrixes in the l-th level of pre-coding matrixes group.

In an implementation, the distance between any two pre-coding matrixes may be the sum of squares of moduli of the two pre-coding matrixes, and for example, the distance between a pre-coding matrix $P_1$ and a pre-coding matrix $P_2$ is abs($P_1^{H*}P_2$), where abs represents a modulus operation, and $P_1^H$ represents a conjugated transpose matrix of $P_1$; and at this time, the distance between the two pre-coding matrixes characterizes the similarity of these two pre-coding matrixes. The distance between any two pre-coding matrixes may alternatively be a Euclid distance, and for example, the distance between a pre-coding matrix $P_1$ and a pre-coding matrix $P_2$ is abs $(P_1-P_2)^2$. The embodiment of the application will not be limited to any particular method for calculating the distance between any two pre-coding matrixes.

It shall be noted that the L number of pre-coding matrixes groups corresponding to each pre-coding matrix in the preset codebook may be determined by the base station, and notified to each UE in a network, for example, notifying to the respective UEs by way of broadcasting; or may be specified in a protocol. The embodiment of the application will not be limited thereto as long as the eNB and the UE may have consistent understanding of the L number of pre-coding matrixes groups corresponding to each pre-coding matrix in the codebook.

In this scenario, the base station obtains the level index l of a pre-coding matrixes group associated with the pre-coding matrix of the UE in the following two implementations.

In a first implementation, the UE selects a pre-coding matrix from the preset codebook based upon a channel measurement, e.g., a CSI measurement, determines it as the pre-coding matrix of the UE, and reports an index of the selected pre-coding matrix to the base station. A particular implementation at the base station side is as follows: the base station receives the index of the pre-coding matrix reported by the UE; the base station determines the level index l of a pre-coding matrixes group associated with the current moving speed of the UE, and the pre-coding matrix reported by the UE according to a correspondence relationship between a moving speed, a pre-coding matrix, and an index of a pre-coding matrixes group upon determining that the current moving speed of the UE is above a preset threshold; and the base station obtains l-th level of pre-coding matrixes group associated with the pre-coding matrix of the UE according to the index of the selected pre-coding matrix reported by the UE, and the determined level index l.

Specifically, corresponding moving speed information (e.g., an interval of moving speeds) may be set for each level of pre-coding matrixes group among L number of pre-coding matrixes groups corresponding to any one of pre-coding matrixes in the preset codebook, and a signal to noise ratio of the UE is greater than or equal to a preset threshold when the UE receives downlink data using any one of the L number of pre-coding matrixes groups and moves at a corresponding moving speed associated with the moving speed information. Upon determining that the current moving speed of the UE is greater than the preset threshold, the base station may determine the corresponding pre-coding matrix according to the index of pre-coding matrix reported by the UE, determine the L number of pre-coding matrixes groups associated with the pre-coding matrix, and determine the l-th level of pre-coding matrixes group associated with the current moving speed of the UE according to the current moving speed of the UE, and moving speed information associated with each of the L number of pre-coding matrixes groups. For example, if the current moving speed of the UE falls into some preset interval of moving speeds, then a pre-coding matrixes group associated with the interval of moving speeds may be selected for pre-coding downlink data of the UE, where the base station may determine the current moving speed of the UE according to downlink channel measurement information reported by the UE; or the base station may determine the current moving speed of the UE by measuring an uplink channel of the UE.

In this implementation, the correspondence relationship between a moving speed, a pre-coding matrix, and a level index of a pre-coding matrixes group may be determined as a result of simulation. By way of an example, a statistic is made of a correspondence relationship between the maximum Doppler shift and a received signal to noise ratio while the UE is moving. For each pre-coding matrix, a threshold (e.g., 70%) for the ratio of a received signal to noise ratio using the first level of pre-coding matrixes group for the pre-coding matrix to a signal to noise ratio for ideal pre-coding is preset, and the lowest level when the threshold is satisfied is determined as a result of simulation. In this way, the correspondence relationship between a range of moving speeds, a pre-coding matrix, and a level index l of a pre-coding matrixes group. Here for a pre-coding matrix, L number of pre-coding matrixes groups corresponding thereto correspond respectively to a moving speed or a range of moving speeds.

In another implementation, the base station transmits the downlink data using the pre-coding matrix reported by the UE, upon determining that the current moving speed of the UE is less than or equal to the preset threshold.

In a second implementation, the UE selects a pre-coding matrix from the preset codebook based upon a channel measurement, determines it as the pre-coding matrix of the UE, selects one pre-coding matrixes group (e.g., the l-th level of pre-coding matrixes group) from L number of pre-coding matrixes groups associated with the pre-coding matrix based upon the channel measurement, and reports an index of the selected pre-coding matrix, and the level index of the selected pre-coding matrixes group (e.g., the level index l) to the base station. A particular implementation at the base station side is as follows: the base station receives the index of the pre-coding matrix, and the level index l of the selected pre-coding matrixes group, both of which are reported by the UE; and the base station obtains the l-th level of pre-coding matrixes group associated with the pre-coding matrix of the UE according to the index of the selected pre-coding matrix and the index of the selected pre-coding matrixes group (e.g., the level index l) which are reported by the UE.

In this implementation, a particular implementation at the UE side is as follows: the UE selects a pre-coding matrix from the preset codebook according to the measurement result of the downlink channel; the UE selects one pre-coding matrixes group from L number of pre-coding matrixes groups associated with the selected pre-coding matrix according to the measurement result of the downlink channel; and the UE reports the index of the selected pre-coding matrix, and the level index of the selected pre-coding matrixes group to the base station.

The second scenario relates to a scenario where the reciprocity of uplink and downlink channels is available, e.g., in a well calibrated TDD system.

In this scenario, the l-th level of pre-coding matrixes group includes the first $N_l$ number of pre-coding matrixes in the preset codebook including the pre-coding matrixes sorted in an ascending order of their distances from a vector associated with the direction of normal of an antenna array of the base station, where $1 \leq N_l$, and $N_l$ is a positive integer.

Specifically the pre-coding matrixes in the preset codebook are grouped into L number of pre-coding matrixes groups, and each pre-coding matrixes group forms a wider coverage area of beams. When grouping the codebook into the respective number of pre-coding matrixes groups, firstly the distances between each pre-coding matrix in the codebook, and the vector associated with the direction of normal of the antenna array of the base station are determined, and sorted in an ascending order; then the first $N_1$ number of pre-coding matrixes are selected as the first level of pre-coding matrixes group for the pre-coding matrix; the first $N_2$ number of pre-coding matrixes are selected as the second level of pre-coding matrixes group for the pre-coding matrix; and so on until the first $N_L$ number of pre-coding matrixes are selected as the L-th level of pre-coding matrixes group for the pre-coding matrix, so that the L number of pre-coding matrixes groups are determined, where the (l+1)-th level of pre-coding matrixes group includes all the pre-coding matrixes in the l-th level of pre-coding matrixes group.

Here there are the same elements in the vector associated with the normal of the antenna array of the base station, and for example, the vector is an all-one vector, that is, all the elements in the vector are 1.

In an implementation, the distance between each precoding matrix, and the vector corresponding to the direction of normal of the antenna array of the base station may be determined by calculating the distances between respective columns of vectors of the pre-coding matrix, and the vector corresponding to the direction of normal respectively, and then determining the sum of the respective calculated distances as the distance between the pre-coding matrix, and the vector corresponding to the direction of normal of the antenna array of the base station, where the distance between the vectors is determined in a similar method to the method for determining the distance between any two pre-coding matrixes, and reference may be made to the related description in the first scenario above, so a repeated description thereof will be omitted here.

It shall be noted that the L number of pre-coding matrixes groups associated with the preset codebook may be determined by the base station, and notified to each UE in a network, for example, notifying to the respective UEs by way of broadcasting; or may be specified in a protocol. The embodiment of the application will not be limited thereto as long as the eNB and the UE may have consistent understanding of the L number of pre-coding matrixes groups associated with each pre-coding matrix in the codebook.

In this scenario, the base station obtains a pre-coding matrixes group associated with the pre-coding matrix of the UE in the following two implementations.

In a first implementation, the base station selects a pre-coding matrix for the UE from the preset codebook, and determines the corresponding pre-coding matrixes group according to a correspondence relationship between a moving speed, a pre-coding matrix, and a level index of a pre-coding matrixes group, specifically as follows.

The base station selects a pre-coding matrix for the UE from the codebook according to a measurement on an uplink channel of the UE; the base station determines the level index of the pre-coding matrixes group associated with the current moving speed of the UE, and the selected pre-coding matrix according to the correspondence relationship between a moving speed, a pre-coding matrix, and a level index of a pre-coding matrixes group upon determining that the current moving speed of the UE is greater than a preset threshold; and the base station obtains the l-th level of pre-coding matrixes group associated with the pre-coding matrix of the UE according to the index of the selected pre-coding matrix, and the determined level index l. Specifically during the process of determining the l-th level of pre-coding matrixes group by the base station, the base station may determine the pre-coding matrix according to an index of pre-coding matrix reported by the UE, determine L number of pre-coding matrixes groups associated with the pre-coding matrix, and determine the l-th level of pre-coding matrixes group associated with the current moving speed of the UE according to the current moving speed of the UE, and moving speed information corresponding to each of the L number of pre-coding matrixes groups.

Here the correspondence relationship between a moving speed, a pre-coding matrix, and a level index of a pre-coding matrixes group may be determined as described in the first implementation above.

In a second implementation, the UE selects a pre-coding matrixes group according to a measurement of a downlink channel, and reports the level index of the selected pre-coding matrixes group to the base station; and the base station determines the pre-coding matrixes group associated with the pre-coding matrix of the UE according to the level index reported by the UE, and a measurement on an uplink channel of the UE. A particular implementation at the base station side is as follows.

The base station receives the level index l of the pre-coding matrixes group, reported by the UE; and the base station selects a pre-coding matrix for the UE from the codebook according to the measurement on the uplink channel of the UE, and determines the pre-coding matrixes group associated with the level index l reported by the UE as the l-th level of pre-coding matrixes group associated with the pre-coding matrix of the UE.

In this scenario, the base station transmits the downlink data to the UE according to the pre-coding matrixes in the obtained l-th level of pre-coding matrixes group as follows: the base station rotates a pointing angle of each pre-coding matrix in the obtained l-th level of pre-coding matrixes group uniformly by a pointing angle of the pre-coding matrix of the UE according to the pointing angle of the pre-coding matrix of the UE; and the base station transmits the downlink data to the UE according to the angle-rotated pre-coding matrixes in the obtained l-th level of pre-coding matrixes group, where the pre-coding matrixes are used for beam-forming, and after the base station performs beam-forming on the downlink data using a pre-coding matrix, there is some angle of a beam transmitted by the base station, where the angle may be referred to as a pointing angle of the pre-coding matrix.

In this implementation, a particular implementation at the UE side is as follows: the UE selects one pre-coding matrixes group from the L number of pre-coding matrixes groups according to a measurement result of the downlink channel; and the UE reports the level index of the selected pre-coding matrixes group to the base station.

Figure 2:
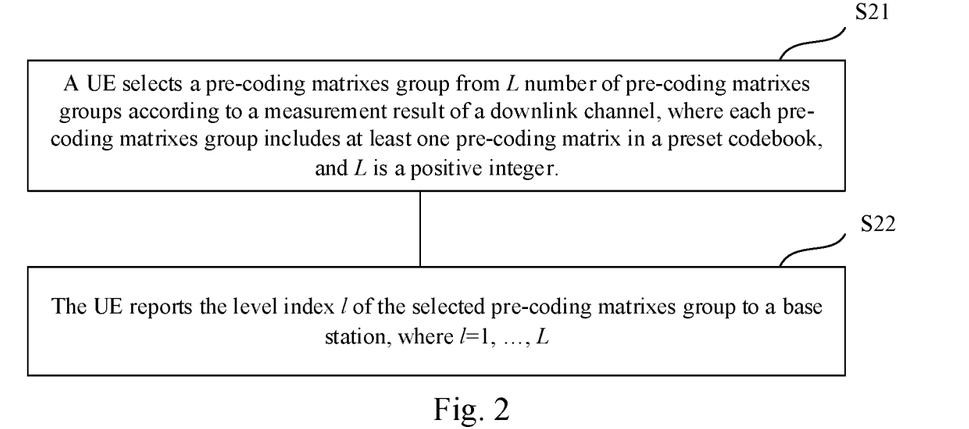
FIG. 2 is a schematic flow chart of a method for feeding back uplink information according to the second embodiment of the application.

Based upon the same inventive idea, a method for feeding back uplink information according to the second embodiment of the application is provided, and as illustrated in FIG. 2, the method includes the following operations.

S21: A UE selects a pre-coding matrixes group from L number of pre-coding matrixes groups according to a measurement result of a downlink channel, where each pre-coding matrixes group includes at least one pre-coding matrix in a preset codebook, and L is a positive integer.

S22: The UE reports the level index l of the selected pre-coding matrixes group to a base station, where l=1, . . . , L.

In the embodiment of the application, the UE selects one pre-coding matrixes group from the L number of pre-coding matrixes groups according to the measurement result of the downlink channel, and reports the level index of the selected pre-coding matrixes group to the base station. In the solution according to the embodiment of the application, the pre-coding matrixes in the codebook are grouped in advance into L number of pre-coding matrixes groups, a user is covered with a wider beam formed using L number of pre-coding matrixes groups, and downlink data are pre-coded using the pre-coding matrixes in each pre-coding matrixes group, so that downlink transmission of the UE moving at the high speed may be guaranteed to thereby improve the reliability of downlink transmission. Specifically the UE may determine the current moving speed of the UE; and upon determining that the current moving speed of the UE is above the preset threshold, the UE may determine L number of pre-coding matrixes groups associated with the selected pre-coding matrix, and select the l-th level of pre-coding matrixes group associated with the current moving speed of the UE according to the current moving speed of the UE, and moving speed information corresponding to each of the L number of pre-coding matrixes groups.

In an application to the second scenario above, the UE may simply perform the operation S21 and the operation S22, and in this scenario, the L number of pre-coding matrixes groups corresponding to the preset codebook may be determined as described in the embodiment as illustrated in FIG. 1.

Optionally in an application to the first scenario above, in S21 where the UE selects one pre-coding matrixes group from the L number of pre-coding matrixes groups according to the measurement result of the downlink channel, the UE further selects one of the number of pre-coding matrixes groups from the preset codebook according to the measurement result of the downlink channel.

In S22 where the UE reports the level index of the selected pre-coding matrixes group to the base station, the UE further reports the level index of the selected pre-coding matrixes group to the base station.

Here in this scenario, L number of pre-coding matrixes groups associated with the each pre-coding matrix in the preset codebook may be determined as described in the embodiment as illustrated in FIG. 1.

The processing flows of the method above may be performed in software program, which may be stored in a storage medium, where the stored software program performs the operations of the methods above upon being invoked.

Figure 3:
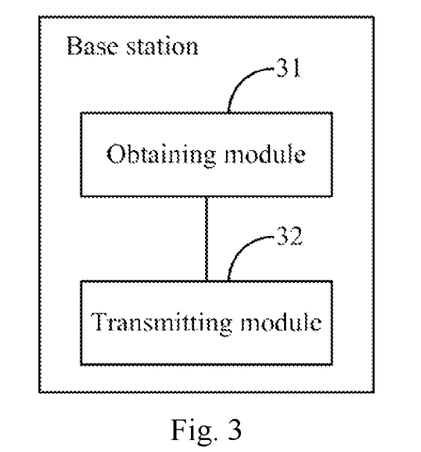
FIG. 3 is a schematic diagram of a base station according to the third embodiment of the application.

Based upon the same inventive idea, a base station according to the third embodiment of the application is provided, and as illustrated in FIG. 3, the base station includes: an obtaining module 31 configured to obtain a pre-coding matrix of a UE, and the l-th level of pre-coding matrixes group among L number of pre-coding matrixes groups associated with the pre-coding matrix of the UE, where each of the L number of pre-coding matrixes groups includes at least one pre-coding matrix from a preset codebook, 1≤l≤L, and l and L are positive integers; and a transmitting module 32 configured to transmit downlink data to the UE according to pre-coding matrixes in the obtained l-th level of pre-coding matrixes group.

In an implementation, each of the L number of pre-coding matrixes groups corresponds respectively to moving speed information, and for the moving speed information associated with any one of the number of pre-coding matrixes groups, a signal to noise ratio of the UE is greater than or equal to a preset threshold when the UE receives downlink data using the any one of the L number of pre-coding matrixes groups and moves at a corresponding moving speed associated with the moving speed information. The obtaining module 31 is configured to determine the l-th level of pre-coding matrixes group associated with the current moving speed of the UE according to the current moving speed of the UE, and moving speed information corresponding respectively to each pre-coding matrixes group in the L number of pre-coding matrixes groups.

In an implementation, the obtaining module 31 is configured: to receive the index of the pre-coding matrix reported by the UE; to determine the current moving speed of the UE; and upon determining that the current moving speed of the UE is greater than a preset threshold, to determine the pre-coding matrix according to the index of the pre-coding matrix reported by the UE, to determine the L number of pre-coding matrixes groups associated with the pre-coding matrix, and to determine the l-th level of pre-coding matrixes group associated with the current moving speed of the UE according to the current moving speed of the UE, and moving speed information associated with each pre-coding matrixes group in the L number of pre-coding matrixes groups.

Or, the obtaining module 31 is configured: to receive the index of the pre-coding matrix, and the level index l of the l-th level of pre-coding matrixes group among the L number of pre-coding matrixes groups associated with the pre-coding matrix, both of which are reported by the UE; and to obtain the l-th level of pre-coding matrixes group among the L number of pre-coding matrixes groups associated with the pre-coding matrix according to the index of the pre-coding matrix and the level index l, both of which are reported by the UE.

In this implementation, any one of the pre-coding matrixes in the codebook corresponds to the L number of pre-coding matrixes groups, the l-th level of pre-coding matrixes group among the L number of pre-coding matrixes groups includes $N_l$ number of pre-coding matrixes, and the $N_l$ number of pre-coding matrixes are the first $N_l$ number of pre-coding matrixes in the codebook including the precoding matrixes sorted in an ascending order of their distances from the any one pre-coding matrix, where 1≤$N_l$, and $N_l$ is a positive integer.

In another implementation, the obtaining module 31 is configured: to select a pre-coding matrix for the UE from the codebook according to a measurement on an uplink channel of the UE; to determine the current moving speed of the UE; to determine a level index l of the l-th level of pre-coding matrixes group associated with the current moving speed of the UE and the selected pre-coding matrix, according to a correspondence relationship between a moving speed, a pre-coding matrix, and a level index of a pre-coding matrixes group, upon determining that the current moving speed of the UE is greater than a preset threshold; and to obtain the l-th level of pre-coding matrixes group associated with the pre-coding matrix of the UE, according to an index of the selected pre-coding matrix, and the determined level index l of the l-th level of pre-coding matrixes group.

Or, the obtaining module 31 is configured: to receive the level index l of the l-th level of pre-coding matrixes group, reported by the UE; and to select the pre-coding matrix for the UE from the codebook according to a measurement on an uplink channel of the UE, and to determine the l-th level of pre-coding matrixes group among the L number of pre-coding matrixes groups associated with the selected pre-coding matrix as the l-th level of pre-coding matrixes group associated with the pre-coding matrix of the UE according to the level index l reported by the UE.

In this implementation, the l-th level of pre-coding matrixes group includes the first $N_l$ number of pre-coding matrixes in the codebook including the pre-coding matrixes sorted in an ascending order of their distances from a vector corresponding to the normal of an antenna array of the base station, where 1≤$N_l$, and $N_l$ is a positive integer.

Optionally the transmitting module 32 is configured: to rotate a pointing angle of each pre-coding matrix in the obtained l-th level of pre-coding matrixes group uniformly by a pointing angle of the pre-coding matrix of the UE according to the pointing angle of the pre-coding matrix of the UE; and to transmit the downlink data to the UE according to the angle-rotated pre-coding matrixes in the obtained l-th level of pre-coding matrixes group.

Figure 4:
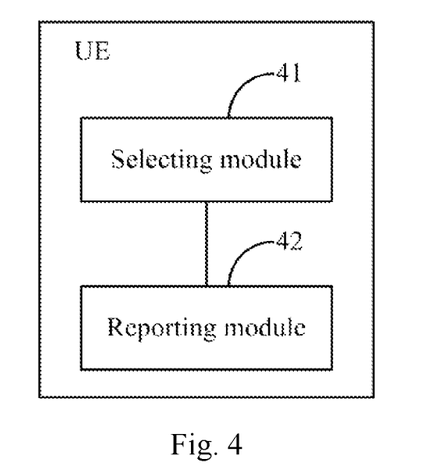
FIG. 4 is a schematic diagram of a UE according to the fourth embodiment of the application.

Based upon the same inventive idea, a UE according to the fourth embodiment of the application is provided, and as illustrated in FIG. 4, the UE includes: a selecting module 41 configured to select a pre-coding matrix from a preset code book according to a measurement result of a downlink channel, and to select the l-th level of pre-coding matrixes group from L number of pre-coding matrixes groups associated with the selected pre-coding matrix, where each of the L number of pre-coding matrixes groups includes at least one pre-coding matrix from the codebook, 1≤l≤L, and l and L are positive integers; and a reporting module 42 configured to report the level index l of the selected pre-coding matrixes group to a base station, where l=1, . . . , L.

In an implementation, the l-th level of pre-coding matrixes group includes the first $N_l$ number of pre-coding matrixes in the codebook including the pre-coding matrixes sorted in an ascending order of their distances from a vector associated with the normal of an antenna array of the base station, where 1≤$N_l$, and $N_l$ is a positive integer.

In another implementation, the l-th level of pre-coding matrixes group for any one of the pre-coding matrixes in the codebook includes the first NA number of pre-coding matrixes in the codebook including the pre-coding matrixes sorted in an ascending order of their distances from the any one pre-coding matrix, where 1≤$N_l$, and $N_l$ is a positive integer.

In another implementation, each of the L number of pre-coding matrixes groups corresponds respectively to moving speed information, and for the moving speed information associated with any one of the number of pre-coding matrixes groups, a signal to noise ratio of the UE is greater than or equal to a preset threshold when the UE receives downlink data using the any one of the L number of pre-coding matrixes groups and moves at a corresponding moving speed associated with the moving speed information.

The selecting module 41 is configured: to determine the current moving speed of the UE; and upon determining that the current moving speed of the UE is greater than a preset threshold, to determine the L number of pre-coding matrixes groups associated with the selected pre-coding matrix, and to determine the l-th level of pre-coding matrixes group associated with the current moving speed of the UE according to the current moving speed of the UE, and moving speed information associated with each pre-coding matrixes group in the L number of pre-coding matrixes groups.

In this implementation, the selecting module 41 is further configured to select a pre-coding matrix from the preset codebook according to the measurement result of the downlink channel.

The reporting module 42 is further configured to report the index of the selected pre-coding matrix to the base station.

Figure 5:
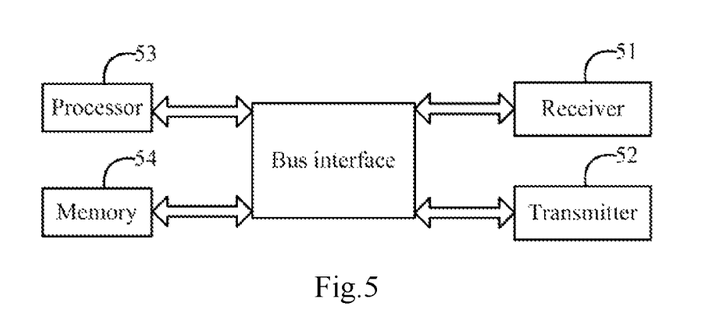
FIG. 5 is a schematic diagram of another base station according to the fifth embodiment of the application.

Based upon the same inventive idea, another eNB according to the fifth embodiment of the application is provided, and the base station may perform the respective operations as described in the first embodiment of the application; and as illustrated in FIG. 5, the base station includes a receiver 51, a transmitter 52, a processor 53, and a memory 54.

The processor 53 is configured to read programs in the memory 54 to execute the following operations.

A pre-coding matrix of a UE, and the l-th level of pre-coding matrixes group among L number of pre-coding matrixes groups associated with the pre-coding matrix are obtained, where each of the L number of pre-coding matrixes groups includes at least one pre-coding matrix from a preset codebook, 1≤l≤L, and l and L are positive integers.

The receiver 51 is configured to be controlled by the processor 53 to receive data.

Here in FIG. 5, the bus architecture may include any number of interconnecting buses and bridges to particularly link together various circuits including one or more processors represented by the processor 53, and one or more memories represented by the memory 54. The bus architecture may further link together various other circuits, e.g., a peripheral device, a manostat, a power management circuit, etc., all of which are well known in the art, so a further description thereof will be omitted in this context. The bus interface serves as an interface. The receiver 51 and the transmitter 52 provide units configured to communicate with various other devices over a transmission medium.

The processor 53 is responsible for managing the bus architecture and performing normal processes, and may further provide various functions including timing, peripheral interface, voltage adjustment, power source management, and other control functions. The memory 504 may store data for use by the processor 53 in performing the operations.

Optionally the processor 53 may be a Central Processing Unit (CPU), an Application Specific Integrated Circuit (ASIC), a Field-Programmable Gate Array (FPGA), or a Complex Programmable Logic Device (CPLD).

In an implementation, the processor 53 is configured to read the programs in the memory to execute the following operations.

Receiving the index of the pre-coding matrix reported by the UE through the receiver 51; determining the level index l of a pre-coding matrixes group associated with the current moving speed of the UE, and the pre-coding matrix reported by the UE according to a correspondence relationship between a moving speed, a pre-coding matrix, and a level index of a pre-coding matrixes group upon determining that the current moving speed of the UE is greater than a preset threshold; and obtaining the l-th level of pre-coding matrixes group associated with the pre-coding matrix of the UE according to the index of the pre-coding matrix reported by the UE, and the determined level index l of the l-th level of pre-coding matrixes group.

Or, receiving the index of the pre-coding matrix, and the level index l of the pre-coding matrixes group, both of which are reported by the UE, through the receiver 51; and obtaining the l-th level of pre-coding matrixes group associated with the pre-coding matrix according to the index of the pre-coding matrix and the level index l, both of which are reported by the UE.

In this implementation, the l-th level of pre-coding matrixes group for any one of the pre-coding matrixes in the codebook includes the first N number of pre-coding matrixes in the codebook including the pre-coding matrixes sorted in an ascending order of their distances from the any one pre-coding matrix, where $1 \le N_l$, and $N_l$ is a positive integer.

In another implementation, the processor 53 is configured to read the program in the memory to execute the following operations.

Selecting a pre-coding matrix for the UE from the codebook according to a measurement on an uplink channel of the UE; determining the level index of the pre-coding matrixes group associated with the current moving speed of the UE, and the selected pre-coding matrix according to a correspondence relationship between a moving speed, a pre-coding matrix, and a level index of a pre-coding matrixes group upon determining that the current moving speed of the UE is greater than a preset threshold; and obtaining the l-th level of pre-coding matrixes group associated with the pre-coding matrix of the UE according to the index of the selected pre-coding matrix, and the determined level index l.

Or, receiving the level index l, of the l-th level of pre-coding matrixes group, reported by the UE, through the receiver 51; and selecting the pre-coding matrix for the UE from the codebook according to a measurement on an uplink channel of the UE, and determining the pre-coding matrixes group associated with the l-th level reported by the UE as the l-th level of pre-coding matrixes group associated with the pre-coding matrix of the UE.

In this implementation, the processor 53 is configured to read the programs in the memory to execute the following operations.

Rotating a pointing angle of each pre-coding matrix in the obtained l-th level of pre-coding matrixes group uniformly by a pointing angle of the pre-coding matrix of the UE according to the pointing angle of the pre-coding matrix of the UE; and controlling the transmitter 52 to transmit the downlink data to the UE, according to the angle-rotated pre-coding matrixes in the obtained l-th level of pre-coding matrixes group.

In this implementation, the l-th level of pre-coding matrixes group includes the first $N_l$ number of pre-coding matrixes in the codebook including the pre-coding matrixes sorted in an ascending order of their distances from a vector associated with the normal of an antenna array of the base station, where $1 \le N_l$, and $N_l$ is a positive integer.

Figure 6:
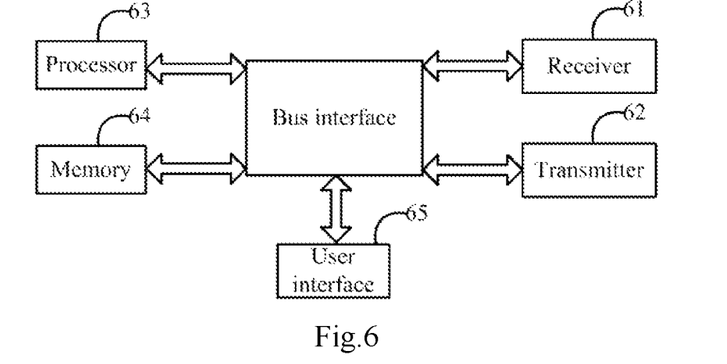
FIG. 6 is a schematic diagram of another UE according to the sixth embodiment of the application.

Based upon the same inventive idea, another UE according to the sixth embodiment of the application is provided, and the UE may perform the respective operations as described in the second embodiment of the application; and as illustrated in FIG. 6, the UE includes a receiver 61, a transmitter 62, a processor 63, and a memory 64.

The processor 63 is configured to read programs in the memory 64 to execute the following operations: selecting a pre-coding matrix from a preset code book according to a measurement result of a downlink channel, and selecting the l-th level of pre-coding matrixes group from L number of pre-coding matrixes groups associated with the pre-coding matrix, where each of the L number of pre-coding matrixes groups includes at least one pre-coding matrix from the codebook, $1 \le l \le L$, and l and L are positive integers; and reporting the level index l of the selected pre-coding matrixes group to a base station.

Here in FIG. 6, the bus architecture may include any number of interconnecting buses and bridges to particularly link together various circuits including one or more processors represented by the processor 63, and one or more memories represented by the memory 64. The bus architecture may further link together various other circuits, e.g., a peripheral device, a manostat, a power management circuit, etc., all of which are well known in the art, so a further description thereof will be omitted in this context. The bus interface serves as an interface. The receiver 61 and the transmitter 62 provide units configured to communicate with various other devices over a transmission medium. For different UEs, the user interface 65 may be an interface via which devices are connected internally and externally as needed, and the connected device include but will not be limited to a keypad, a display, a speaker, a microphone, a joystick, etc.

The processor 63 is responsible for managing the bus architecture and performing normal processes, and may further provide various functions including timing, peripheral interface, voltage adjustment, power source management, and other control functions. The memory 604 may store data for use by the processor 63 in performing the operations.

Optionally the processor 63 may be a CPU, an ASIC, an FPGA, or a CPLD.

In an implementation, the l-th level of pre-coding matrixes group includes the first $N_l$ pre-coding matrixes in the codebook including the pre-coding matrixes sorted in an ascending order of their distances from a vector associated with the normal of an antenna array of the base station, where $1 \le N_l$, and $N_l$ is a positive integer.

In another implementation, the l-th level of pre-coding matrixes group for any one of the pre-coding matrixes in the codebook includes the first $N_l$ pre-coding matrixes in the codebook including the pre-coding matrixes sorted in an ascending order of their distances from the any one pre-coding matrix, where $1 \le N_l$, and $N_l$ is a positive integer.

In this implementation, the processor 63 is further configured to read the programs in the memory to further execute the following operations: selecting a pre-coding matrix from the preset codebook according to the measurement result of the downlink channel; and controlling the transmitter 62 to report the index of the selected pre-coding matrix to the base station.

Those skilled in the art shall appreciate that the embodiments of the application may be embodied as a method, a system or a computer program product. Therefore the application may be embodied in the form of an all-hardware embodiment, an all-software embodiment or an embodiment of software and hardware in combination. Furthermore the application may be embodied in the form of a computer program product embodied in one or more computer useable storage mediums (including but not limited to a disk memory, a CD-ROM, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram may be embodied in computer program instructions. These computer program instructions may be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions may also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions may also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the application have been described, those skilled in the art benefiting from the underlying inventive concept may make additional modifications and variations to these embodiments. Therefore the appended claims are intended to be construed as encompassing the preferred embodiments and all the modifications and variations coming into the scope of the application.

Evidently those skilled in the art may make various modifications and variations to the application without departing from the spirit and scope of the application. Thus the application is also intended to encompass these modifications and variations thereto so long as the modifications and variations come into the scope of the claims appended to the application and their equivalents.

What is claimed is:

1. A method for transmitting downlink data, the method comprising:
   obtaining, by a base station, a pre-coding matrix of a User Equipment (UE), and an l-th level of pre-coding matrixes group among L number of pre-coding matrixes groups associated with the pre-coding matrix of the UE, wherein each of the L number of pre-coding matrixes groups comprises at least one pre-coding matrix from a preset codebook, $1 \leq l \leq L$, and l and L are positive integers; and
   transmitting, by the base station, downlink data to the UE according to pre-coding matrixes in the l-th level of pre-coding matrixes group;
   wherein any one of pre-coding matrixes in the preset codebook corresponds to the L number of pre-coding matrixes groups, the l-th level of pre-coding matrixes group comprises $N_l$ number of pre-coding matrixes, the $N_l$ number of pre-coding matrixes are first $N_l$ number of pre-coding matrixes in the preset codebook comprising the pre-coding matrixes sorted in an ascending order of their distances from the any one of pre-coding matrixes, or the $N_l$ number of pre-coding matrixes are first $N_l$ number of pre-coding matrixes in the preset codebook comprising the pre-coding matrixes sorted in an ascending order of their distances from a vector associated with a normal of an antenna array of the base station, $1 \leq N_l$ and $N_l$ is a positive integer.

2. The method according to claim 1, wherein obtaining, by the base station, the l-th level of pre-coding matrixes group among the L number of pre-coding matrixes groups associated with the pre-coding matrix of the UE comprises:
   obtaining, by the base station, the l-th level of pre-coding matrixes group associated with a current moving speed of the UE, according to the current moving speed of the UE and moving speed information associated with each of the L number of pre-coding matrixes groups;
   wherein for the moving speed information associated with any one of the L number of pre-coding matrixes groups, a signal to noise ratio of the UE is greater than or equal to a preset threshold when the UE receives downlink data using the any one of the L number of pre-coding matrixes groups and moves at a corresponding moving speed associated with the moving speed information.

3. The method according to claim 1, wherein obtaining, by the base station, the pre-coding matrix of the UE, and the l-th level of pre-coding matrixes group among the L number of pre-coding matrixes groups associated with the pre-coding matrix of the UE comprises:
   receiving, by the base station, an index of the pre-coding matrix reported by the UE;
   determining, by the base station, a current moving speed of the UE; and
   upon determining that the current moving speed of the UE is greater than a preset threshold, determining, by the base station, the pre-coding matrix according to the index of the pre-coding matrix reported by the UE;
   determining, by the base station, the L number of pre-coding matrixes groups associated with the pre-coding matrix; and
   determining, by the base station, the l-th level of pre-coding matrixes group associated with the current moving speed of the UE according to the current moving speed of the UE, and moving speed information associated with each of the L number of pre-coding matrixes groups;
   or,
   obtaining, by the base station, the pre-coding matrix of the UE, and the l-th level of pre-coding matrixes group among the L number of pre-coding matrixes groups associated with the pre-coding matrix of the UE comprises:

receiving, by the base station, an index of the pre-coding matrix, and a level index l of the l-th level of pre-coding matrixes group among the L number of pre-coding matrixes groups associated with the pre-coding matrix, both of which are reported by the UE; and obtaining, by the base station, the l-th level of pre-coding matrixes group among the L number of pre-coding matrixes groups associated with the pre-coding matrix according to the index of the pre-coding matrix and the level index l of the l-th level of pre-coding matrixes group.

4. The method according to claim 1, wherein obtaining, by the base station, the pre-coding matrix of the UE, and the l-th level of pre-coding matrixes group among the L number of pre-coding matrixes groups associated with the pre-coding matrix of the UE comprises:

measuring, by the base station, an uplink channel of the UE, and selecting the pre-coding matrix for the UE from the preset codebook according to the measurement result;

determining, by the base station, a current moving speed of the UE;

determining, by the base station, a level index l of the l-th level of pre-coding matrixes group associated with the current moving speed of the UE and the selected pre-coding matrix, according to a correspondence relationship between a moving speed, a pre-coding matrix, and a level index of a pre-coding matrixes group, upon determining that the current moving speed of the UE is greater than a preset threshold; and obtaining, by the base station, the l-th level of pre-coding matrixes group associated with the pre-coding matrix of the UE, according to an index of the selected pre-coding matrix, and the determined level index l of the l-th level of pre-coding matrixes group;

or, obtaining, by the base station, the pre-coding matrix of the UE, and the l-th level of pre-coding matrixes group among the L number of pre-coding matrixes groups associated with the pre-coding matrix of the UE comprises:

receiving, by the base station, a level index l of the l-th level of pre-coding matrixes group, reported by the UE;

selecting, by the base station, the pre-coding matrix for the UE from the preset codebook according to a measurement on an uplink channel of the UE; and determining, by the base station, the l-th level of pre-coding matrixes group among the L number of pre-coding matrixes group associated with the selected pre-coding matrix as the l-th level of pre-coding matrixes group associated with the pre-coding matrix of the UE according to the level index l of the l-th level of pre-coding matrixes group reported by the UE.

5. The method according to claim 1, wherein transmitting, by the base station, the downlink data to the UE according to the pre-coding matrixes in the l-th level of pre-coding matrixes group comprises:

rotating, by the base station, a pointing angle of each pre-coding matrix in the l-th level of pre-coding matrixes group uniformly by a pointing angle of the pre-coding matrix according to the pointing angle of the pre-coding matrix; and transmitting, by the base station, the downlink data to the UE according to the angle-rotated pre-coding matrixes in the l-th level of pre-coding matrixes group.

6. A method for feeding back uplink information, the method comprising:

selecting, by a User Equipment (UE), a pre-coding matrix from a preset codebook according to a measurement result of a downlink channel, and selecting an l-th level of pre-coding matrixes group from L number of pre-coding matrixes groups associated with the selected pre-coding matrix, wherein each of the L number of pre-coding matrixes groups comprises at least one pre-coding matrix from the preset codebook, $1 \leq l \leq L$, and l and L are positive integers; and reporting, by the UE, a level index l of the selected l-th level of pre-coding matrixes group to a base station;

wherein any one of pre-coding matrixes in the preset codebook corresponds to the L number of pre-coding matrixes groups, the l-th level of pre-coding matrixes group comprises $N_l$ number of pre-coding matrixes, the $N_l$ number of pre-coding matrixes are first $N_l$ number of pre-coding matrixes in the preset codebook comprising the pre-coding matrixes sorted in an ascending order of their distances from the any one of pre-coding matrixes, or the $N_l$ number of pre-coding matrixes are first $N_l$ number of pre-coding matrixes in the preset codebook comprising the pre-coding matrixes sorted in an ascending order of their distances from a vector associated with a normal of an antenna array of the base station, $1 \leq N_l$ and $N_l$ is a positive integer.

7. The method according to claim 6, wherein the selecting, by the UE, the l-th level of pre-coding matrixes group from the L number of pre-coding matrixes groups associated with the selected pre-coding matrix comprises:

determining, by the UE, a current moving speed of the UE;

determining, by the UE, the L number of pre-coding matrixes groups associated with the selected pre-coding matrix, upon determining that the current moving speed of the UE is greater than a preset threshold; and selecting, by the UE, the l-th level of pre-coding matrixes group associated with the current moving speed of the UE, according to the current moving speed of the UE and moving speed information associated with each of the L number of pre-coding matrixes groups;

wherein for the moving speed information associated with any one of the L number of pre-coding matrixes groups, a signal to noise ratio of the UE is greater than or equal to a preset threshold when the UE receives downlink data using the any one of the L number of pre-coding matrixes groups and moves at a corresponding moving speed associated with the moving speed information.

8. The method according to claim 6, wherein the method further comprises:

reporting, by the UE, an index of the selected pre-coding matrix to the base station.

9. A base station, comprising a processor, a memory, a receiver and a transmitter, wherein the memory is configured to store programs, and the processor is configured to read the programs in the memory to execute:

obtaining a pre-coding matrix of a User Equipment (UE), and an l-th level of pre-coding matrixes group among L number of pre-coding matrixes groups associated with the pre-coding matrix of the UE, wherein each of the L number of pre-coding matrixes groups comprises at least one pre-coding matrix from a preset codebook, $1 \leq l \leq L$, and l and L are positive integers; and transmitting downlink data to the UE through the transmitter according to pre-coding matrixes in the l-th level of pre-coding matrixes group;

wherein any one of pre-coding matrixes in the preset codebook corresponds to the L number of pre-coding matrixes groups, the l-th level of pre-coding matrixes group comprises $N_l$ number of pre-coding matrixes, the $N_l$ number of pre-coding matrixes are first $N_l$ number of pre-coding matrixes in the preset codebook comprising the pre-coding matrixes sorted in an ascending order of their distances from the any one of pre-coding matrixes, or the $N_l$ number of pre-coding matrixes are first $N_l$ number of pre-coding matrixes in the preset codebook comprising the pre-coding matrixes sorted in an ascending order of their distances from a vector associated with a normal of an antenna array of the base station, $1 \leq N_l$ and $N_l$ is a positive integer.

10. The base station according to claim 9, wherein the processor is further configured to read the programs in the memory to execute:
  obtaining the l-th level of pre-coding matrixes group associated with a current moving speed of the UE, according to the current moving speed of the UE and moving speed information associated with each of the L number of pre-coding matrixes groups;
  wherein for the moving speed information associated with any one of the L number of pre-coding matrixes groups, a signal to noise ratio of the UE is greater than or equal to a preset threshold when the UE receives downlink data using the any one of the L number of pre-coding matrixes groups and moves at a corresponding moving speed associated with the moving speed information.

11. The base station according to claim 9, wherein the processor is further configured to read the programs in the memory to execute:
  receiving an index of the pre-coding matrix reported by the UE through the receiver;
  determining a current moving speed of the UE; and
  upon determining that the current moving speed of the UE is greater than a preset threshold, determining the pre-coding matrix according to the index of the pre-coding matrix reported by the UE;
  determining the L number of pre-coding matrixes groups associated with the pre-coding matrix; and
  determining the l-th level of pre-coding matrixes group associated with the current moving speed of the UE according to the current moving speed of the UE, and moving speed information associated with each of the L number of pre-coding matrixes group;
  or,
  receiving through the receiver an index of the pre-coding matrix, and a level index l of the l-th level of pre-coding matrixes group among the L number of pre-coding matrixes groups associated with the pre-coding matrix, both of which are reported by the UE; and
  obtaining the l-th level of pre-coding matrixes group among the L number of pre-coding matrixes groups associated with the pre-coding matrix according to the index of the pre-coding matrix and the level index l of the l-th level of pre-coding matrixes group.

12. The base station according to claim 9, wherein the processor is further configured to read the programs in the memory to execute:
  measuring an uplink channel of the UE, and selecting the pre-coding matrix for the UE from the preset codebook according to the measurement result;
  determining a current moving speed of the UE;
  determining a level index l of the l-th level of pre-coding matrixes group associated with the current moving speed of the UE and the selected pre-coding matrix, according to a correspondence relationship between a moving speed, a pre-coding matrix, and a level index of a pre-coding matrixes group, upon determining that the current moving speed of the UE is greater than a preset threshold; and
  obtaining the l-th level of pre-coding matrixes group associated with the pre-coding matrix of the UE, according to an index of the selected pre-coding matrix, and the determined level index l of the l-th level of pre-coding matrixes group;
  or,
  receiving a level index l of the l-th level of pre-coding matrixes group, reported by the UE through the receiver;
  selecting the pre-coding matrix for the UE from the reset codebook according to a measurement on an uplink channel of the UE; and
  determining the l-th level of pre-coding matrixes group among the L number of pre-coding matrixes groups associated with the selected pre-coding matrix as the l-th level of pre-coding matrixes group associated with the pre-coding matrix of the UE according to the level index l of the l-th level of pre-coding matrixes group reported by the UE.

13. The base station according to claim 9, wherein the processor is further configured to read the programs in the memory to execute:
  rotating a pointing angle of each pre-coding matrix in the l-th level of pre-coding matrixes group uniformly by a pointing angle of the pre-coding matrix according to the pointing angle of the pre-coding matrix; and
  transmitting the downlink data to the UE through the transmitter according to the angle-rotated pre-coding matrixes in the l-th level of pre-coding matrixes group.

14. A User Equipment (UE), comprising a processor, a memory, a receiver and a transmitter, wherein the memory is configured to store programs, and the processor is configured to read the programs in the memory to execute:
  selecting a pre-coding matrix from a preset codebook according to a measurement result of a downlink channel, and selecting an l-th level of pre-coding matrixes group from L number of pre-coding matrixes groups associated with the selected pre-coding matrix, wherein each of the L number of pre-coding matrixes groups comprises at least one pre-coding matrix from the preset codebook, $1 \leq l \leq L$, and l and L are positive integers; and
  reporting a level index l of the selected l-th level of pre-coding matrixes group to a base station through the transmitter;
  wherein any one of pre-coding matrixes in the preset codebook corresponds to the L number of pre-coding matrixes groups, the l-th level of pre-coding matrixes group comprises $N_l$ number of pre-coding matrixes, the $N_l$ number of pre-coding matrixes are first $N_l$ number of pre-coding matrixes in the preset codebook comprising the pre-coding matrixes sorted in an ascending order of their distances from the any one of pre-coding matrixes, or the $N_l$ number of pre-coding matrixes are first $N_l$ number of pre-coding matrixes in the preset codebook comprising the pre-coding matrixes sorted in an ascending order of their distances from a vector associated with a normal of an antenna array of the base station, $1 \leq N_l$ and $N_l$ is a positive integer.

15. The UE according to claim 14, wherein the processor is further configured to read the programs in the memory to execute:
- determining a current moving speed of the UE;
- determining the L number of pre-coding matrixes groups associated with the selected pre-coding matrix, upon determining that the current moving speed of the UE is greater than a preset threshold; and
- selecting the l-th level of pre-coding matrixes group associated with the current moving speed of the UE, according to the current moving speed of the UE and moving speed information associated with each of the L number of pre-coding matrixes groups;
- wherein for the moving speed information associated with any one of the L number of pre-coding matrixes groups, a signal to noise ratio of the UE is greater than or equal to a preset threshold when the UE receives downlink data using the any one of the L number of pre-coding matrixes groups and moves at a corresponding moving speed associated with the moving speed information.

16. The UE according to claim 14, wherein the transmitter is further configured to be controlled by the processor to report an index of the selected pre-coding matrix to the base station.

* * * * *